UNITED STATES PATENT OFFICE.

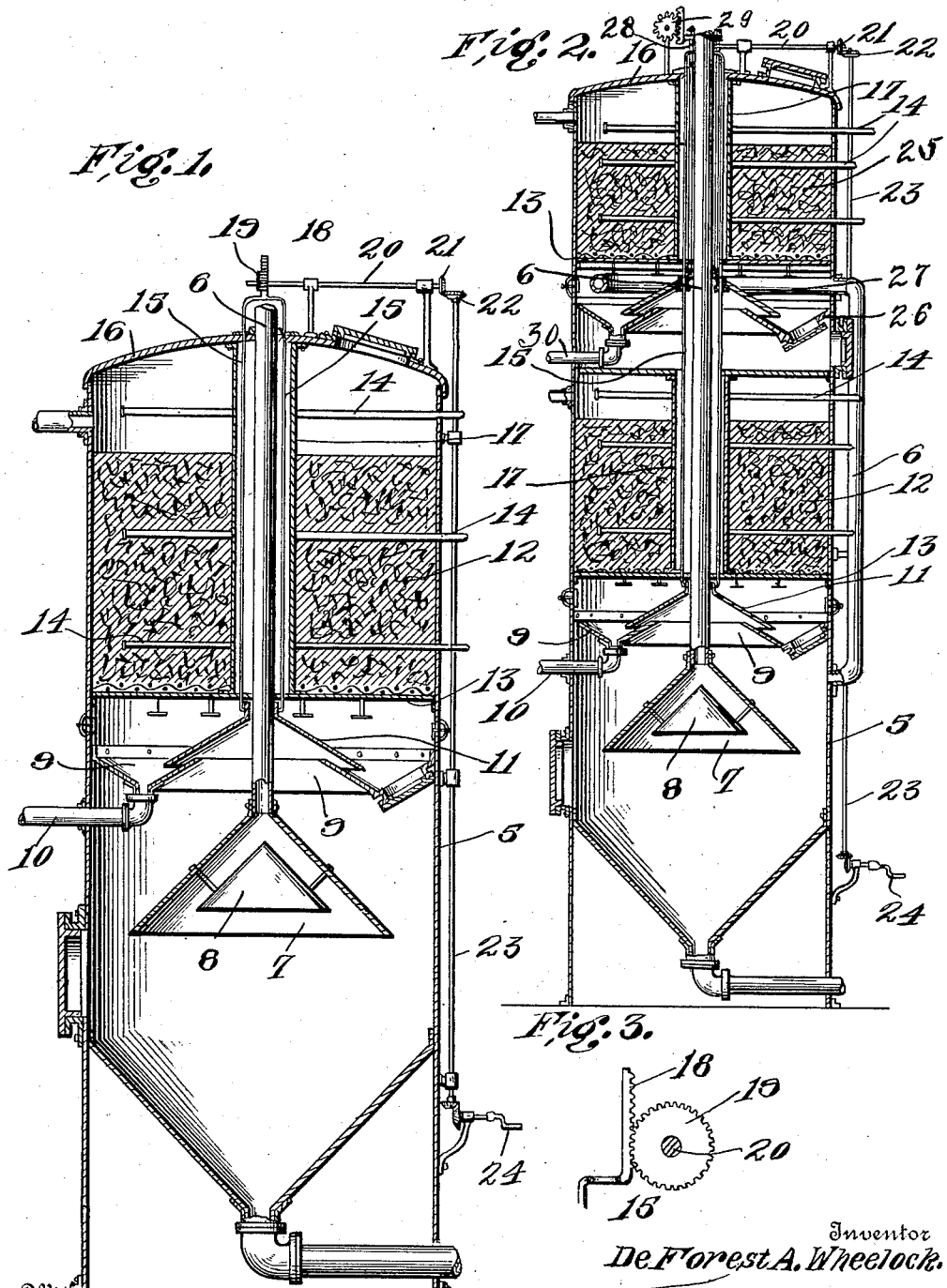

DE FOREST A. WHEELOCK, OF WARREN, PENNSYLVANIA, ASSIGNOR TO HAMMOND ENGINEERING COMPANY, OF WARREN, PENNSYLVANIA, A CORPORATION OF DELAWARE.

LIQUID-PURIFICATION APPARATUS.

1,065,992.  Specification of Letters Patent.  Patented July 1, 1913.

Application filed July 30, 1912. Serial No. 712,308.

*To all whom it may concern:*

Be it known that I, DE FOREST A. WHEELOCK, a citizen of the United States of America, and resident of Warren, in the county of Warren and State of Pennsylvania, have invented certain new and useful Improvements in Liquid-Purification Apparatus, of which the following is a specification.

This invention relates to water purification apparatus and has relation particularly to a combined settling tank and filter designed to separate foreign substances from water by gravity and filtration; means being provided for supplying the untreated material preferably to that portion of the apparatus designed to separate liquids from solids and semi-solids by gravity.

An object of this invention is to provide novel means for permitting the separation of solids or semi-solids from liquid by gravity and for treating the liquid after the separation aforesaid has taken place or when the separation is partially accomplished, for the purpose of purifying the said liquid or arresting any matter contained in the water which is of a solid or semi-solid nature and in discharging the liquid from the apparatus free of such impurities.

From the foregoing it will be apparent that it is the applicant's intention to utilize the apparatus for the purification of water, but the said apparatus is capable of still further utility in connection with sewage disposal or sewage treating plants wherein the solids or semi-solids of sewage are permitted to collect by gravity within what may be termed a sediment compartment wherein sediment is collected by gravity and the liquid portion of the sewage is caused to rise and percolate through a filtering bed from whence it may be conducted to pipes or other conduits for carrying the same to any source of disposal.

It is furthermore the purpose of the inventor to employ the apparatus in connection with the separation of solids or semi-solids from other liquids, and he therefore does not wish to be limited with respect to the said use.

A still further object of this invention is to provide novel means for cleaning the filter bed through the application thereto of water or air or other agent which may be found suitable for the purpose, it being the purpose of the inventor to provide means for delivering the purifying or cleaning agent at points intermediate the top and bottom of the filter bed in order to effect agitation of the granular material which usually constitutes part of a filter bed so that foreign substances may be dislodged and removed by the passage of the said cleaning agent from the interior of the bed toward the surface thereof. It has been found in practice that the application of a cleaning agent to the surface of the filter bed results in creating more or less density of the said bed so that the cleaning agent does not produce a flushing or cleaning action in its passage therethrough to the extent which results from the application of the cleaning agent to points interiorly of the bed.

A further object of this invention is to provide novel means for interrupting communication between the sediment compartment and the filter when the filter cleaning agent is being discharged, novel means being provided for collecting the filter cleaning agent and the impurities dislodged thereby and carried therewith and discharging the same exteriorly of the apparatus, it being the purpose of the inventor to permit the process of sedimentation to continue in the sediment compartment while the filter is being cleaned.

A still further object of this invention is to provide novel means for operating means for interrupting communication between the sediment compartment and the filter without dislodging the material comprising the filtering bed and furthermore, to provide the compartments or sections of the casing of the apparatus or the partitions thereof with suitable man-holes or guarded openings for the removal therefrom of foreign substances, or for the purpose of gaining access to the interior for any cause.

A still further object of this invention is to provide an apparatus of the character noted in which a sediment compartment is associated and has communication with a plurality of filtering beds in order that the discharge of liquid from the sediment compartment may be continuous through one or more of the filters while one or more is being cleaned.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of an apparatus embodying the invention; Fig. 2 illustrates a similar view showing the same with a plurality of filters; and Fig. 3 illustrates a detail view of a rack and pinion for operating the partition member.

In these drawings 5 denotes a casing which may be preferably termed a tank having a tapered bottom in order that the sediment collected therein may be guided to the restricted portion thereof from whence it may be readily removed as by a suction means. The tank has a supply pipe 6 leading into it from any direction desired, here shown as extending vertically therein and terminating in a flared mouth 7 guarded by a baffle 8. In order to divide the tank into a sediment compartment and a filtering compartment, an inwardly extending annular flange 9 is suspended within the tank and preferably has its outer edge in contact with the inner wall of the tank, the joint therebetween being preferably water tight. The flange 9 is shaped to form a gutter and is therefore lower at a point intermediate its edges in order that the filter cleaning agent may descend into the gutter and flow through the discharge pipe 10 carrying with it the foreign substances dislodged from the filter bed. The upper surface of the annular flange near its inner edge is engaged by a ring 11, here shown in the form of a truncated cone which with the said annular flange forms a barrier or partition between the said compartment and the filter, the said ring serving to divert the said cleaning agent passing through the filter bed and direct it to the trough formed by the annular flange.

The filter bed 12 may be of any granular material of which filter beds are usually employed and as the composition of the filter bed forms no part of the present invention, it will not be described in detail.

I here show the filter bed as being supported on beams 13 spaced apart any appropriate distance, the said filtering bed having one or more laterally disposed pipes or conduits 14 embedded therein provided with openings for the passage therethrough of the filter cleaning agent. The pipes 14 may be connected to any source of supply for the filter cleaning agent as will be readily understood.

As a means for operating the ring 11 with relation to the annular flange, the said ring is here shown as having rods 15 connected to it which rods extend through the top 16 of the tank and provided with means by which the said rods are reciprocated. In order to allow for the free reciprocation of the rods 15 without disturbing the filtering bed, the supply pipe and the said rods are inclosed by a casing 17 extending from the top of the tank to the bases of the beams 13 although the exact point of termination of the said casing is not to be restricted.

While the rods 15 may be actuated in any appropriate way, I have illustrated one method of actuating the said rods the same consisting in a rack 18 attached to the rods and pinions 19 in engagement with the rack and adapted, by its rotation, to move the said rack vertically. The pinion is mounted on a shaft 20 having a gear wheel 21 thereon meshing with a gear wheel 22 on the shaft 23 which shaft 23 is rotated as by a crank handle 24.

As has been stated previously, it is the purpose of the inventor to provide a plurality of filters in communication with the sediment compartment and the illustration of one means for carrying this portion of the invention into practice is to be found in the drawing wherein in addition to the filter such as just described, is employed, there is superposed a second filter 25 with a partition formed by an annular flange 26 and a ring 27 similar to like parts heretofore described in disclosing the first mentioned filter, the said ring being operated by rods 28 and rod operating mechanism 29 which may be a duplicate of the rod operating mechanism just described, the rods for operating the several rings being contained within a casing for guarding the filter bed against the action of said rods. A conduit or pipe 30 leads from the sediment compartment of the superposed filter.

I claim—

1. In a liquid purification apparatus, a tank having a tapered wall at its lower end, an annular ring of trough-like formation secured interiorly of the tank intermediate its height forming a partial partition, a member coacting with the flange to complete a partition, a filter above the partition, a supply pipe extending into the tank below the partition, a member for operating one of the members forming the partition, a casing extending through the filter in which said member is movable, and means for operating said member.

2. In a liquid purification apparatus, a tank having a tapered wall at its lower end, an annular ring of trough like formation secured interiorly of the tank intermediate its height forming a partial partition, a member coacting with the flange to complete a partition, a filter above the partition, a supply pipe extending into the tank below the partition, a member for operating one of the members forming the partition, a casing extending through the filter in which the said member is movable, means for operating said member, and means for supplying a filter cleaning agent to said filter.

3. In a liquid purification apparatus, a tank, a filter therein, a trough like member therebelow for partially separating the portion of the tank containing the filter from a portion of the tank therebelow, a member coacting with the trough like member for wholly separating the portion of the tank containing the filter from the portion therebelow, means for moving one member with relation to the other whereby they are separated to form a passage therebetween, means for conducting the material collected in the trough like member, means for supplying liquid to the tank, and means for supplying a filter cleaning agent to said filter.

4. In a liquid purification apparatus, a tank, a filter therein, a trough like member in the tank forming a partial partition therein, a member coacting with the trough like member for forming a partition, and means for moving one part with relation to the other for creating a passage therebetween.

5. In a liquid purification apparatus, a tank, an annular flange secured to the inner wall thereof to form a trough and a partial partition between the sediment compartment and filter, a ring coöperating with the flange for completely partitioning the said compartment from the filter, and means for moving the ring with relation to the flange.

In testimony whereof, I have hereunto affixed my signature in the presence of two witnesses.

DE FOREST A. WHEELOCK.

Witnesses:
L. E. Barkley,
P. A. Putnam.